United States Patent [19]
Whitaker et al.

[11] 4,381,031
[45] Apr. 26, 1983

[54] SPA-DOMESTIC HOT WATER HEAT EXCHANGER

[76] Inventors: Larry D. Whitaker, 3560 Ingraham Ave., San Diego, Calif. 92109; Donald M. Herriott, 3234 Wellesley Ave., San Diego, Calif. 92122

[21] Appl. No.: 200,947

[22] Filed: Oct. 27, 1980

[51] Int. Cl.³ .............................................. F24H 3/00
[52] U.S. Cl. ...................................... 165/39; 165/47; 165/DIG. 12
[58] Field of Search .................... 4/493; 126/415, 416; 165/39, 47, 120, 154, 164, DIG. 12

[56] References Cited

U.S. PATENT DOCUMENTS

| | | | |
|---|---|---|---|
| 1,991,980 | 2/1935 | Hetzer | 165/39 |
| 2,028,471 | 1/1936 | Parent et al. | 165/143 |
| 2,633,108 | 3/1953 | Sterick | 165/DIG. 12 |
| 3,906,928 | 9/1975 | Wright | 4/493 |
| 3,986,344 | 10/1976 | Newman | 62/238.6 |
| 4,202,406 | 5/1980 | Avery | 165/47 |

FOREIGN PATENT DOCUMENTS

| | | | |
|---|---|---|---|
| 2806029 | 8/1979 | Fed. Rep. of Germany | 165/DIG. 12 |
| 2905251 | 10/1979 | Fed. Rep. of Germany | 62/238.6 |
| 2381257 | 9/1978 | France | 165/DIG. 12 |

*Primary Examiner*—Samuel Scott
*Assistant Examiner*—Margaret A. Focarino
*Attorney, Agent, or Firm*—Brown & Martin

[57] ABSTRACT

A first heat exchanger loop incorporates a thermostatically controlled circulating pump which draws hot water from the heater. Spa water is circulated by the spa pump through a second heat exchange loop surrounding the first. The thermostat sensor detects spa temperature when the spa pump is on and detects heater temperature, and therefore automatically shuts off the circulating pump, when the spa pump is off.

9 Claims, 4 Drawing Figures

SPA-DOMESTIC HOT WATER HEAT EXCHANGER

BACKGROUND OF THE INVENTION

Spas, sometimes known as hydrotherapy pools, have enjoyed a wide popularity and are utilized both for therapy and recreation/relaxation. Such spas typically contain as much as 500 gallons of water, which must be heated from ambient to approximately 100 to 105 degrees farenheit. The necessary heat is typically provided by a separate heater, comparable to a swimming pool heater, and fired by gas or an electric power, depending upon the utilities available at the spa location. Such heaters normally take the full flow of the spa circulating pump and heat the water passing through the heater by a few degrees per pass. Because they pass a high volume of water, they must be located immediately adjacent to the spa to avoid high pumping losses. Thus, a separate gas line or high wattage electric line must be run directly to the spa area. The expense of this separate heating installation is a significant proportion of the total cost of the spa. Because of the much higher energy cost efficiency, gas heaters are preferred where gas is available. The use of a gas heater requires a base typically of concrete, and then installation involving placement of the necessary gas line and plumbing connections to and from the spa. Lastly, provision must be made for the dispersal of the flue gasses from the spa away from combustible surfaces. The high cost of these installations discourages their use even with permanent installations where long piping runs must be made. Gas heaters are particularly difficult to cost justify as a retrofit for an existing spa. Such installations are even more impractical in association with portable spas, and as a result portable spas rely almost exclusively on electric heat.

As a result of the high cost of a separate heating installation, it would be desirable to utilize an existing source of heat that is available in the typical home for heating spas. The use of an existing heat source typically requires a heat exchanger, and a liquid-to-liquid heat exchanger is necessary to obtain a practical cost-/efficiency ratio. Thus the only source of heat in a typical home potentially suitable for heating the spa is the conventional hot water heater. Conventional hot water heaters have not been adapted for this purpose perhaps because the heater is typically located at a site remote from that utilized for the spa, which would result in a high pumping losses and high thermal losses in bringing the hot water to a heat exchanger located within the spa. Accordingly, the heat exchangers which are available for installation in the spa have not generally seen application to the conventional hot water heater, but rather have been utilized exclusively in association with solar systems. The typical remote relationship between the conventional hot water heater and spa also results in long electrical runs to any control device on the hot water heater. Further, it has been assumed that the conventional hot water heater cannot heat the typical spa in a reasonable period of time or while maintaining sufficient water temperature for domestic uses.

Therefore it is desirable to have a spa-domestic hot water heat exchanger that efficiently transfers heat to the spa water without excessive pumping or thermal losses and which does not require control connections between the spa and hot water heater locations.

SUMMARY OF THE INVENTION

In an exemplary embodiment of the invention, a heat exchanger is provided which permits the use of the domestic hot water heater to safely and efficiently heat spa water at a location immediately adjacent to the hot water heater (or one of the piping runs from the hot water heater) and which incorporates a self contained control mechanism for delivering heat to the spa water only when the spa pump is functioning and the temperature of the spa water is below a set point. A first heat exchange loop is connected between the hot water outlet and cold water inlet of the water heater. A fractional-horse-power, electric-motor-driven-circulation pump is utilized to circulate hot water through the first loop. A second heat exchange loop surrounds the first. The second heat exchange loop is connected by lengths of pipe or hose necessary to reach the inlet and outlet connections of the spa pump.

When the spa pump is on, a portion of the water circulated by the spa pump is circulated through the second heat exchange loop. A relative low pressure is involved so that low cost plastic pipe or conventional garden hose may be utilized. Since both plastic pipe and garden hose have a relatively high insulating quality and since a relatively low temperature differential exists between the ambient air-ground temperature and the spa temperature (a maximum of approximately 105 degrees), there are relatively low thermal losses. Since the existing spa pump is utilized for circulation, there are no additional pumping losses.

A thermostat is in thermal contact with the circulated spa water and through the circulated spa water is in thermal conductive relationship with the circulated domestic hot water. When the spa pump is operating the thermostat senses the temperature of the water being drawn out of the spa, and so long as that temperature is below the thermostat set point, the thermostat maintains an electrical connection to a circulating pump in the first heat exchange loop. Thus hot water is drawn out of the hot water outlet of the hot water heater and into thermal contact with the second heat exchange loop. When the set point is reached, the thermostat opens the electrical connection and thereby turns off the electrical pump and ceases to withdraw heat from the hot water heater. In this phase of operation, the bulb continues to sense the spa water temperature. However, if the spa pump is turned off, then water ceases circulation in the second heat exchange loop and the water in the first heat exchanged loop is heated by conduction from the connections made to the hot water heater or by intermittent operation of of the circulating pump. The heated water in the first loop transfers heat through the spa water to the thermostat so that the thermostat senses a temperature above its set point and does not call for continuous operation of the circulating pump. Depending on the length of the connections involved, an occassional intermittent operation of the pump may be called for which will immediately inject high temperature water in the first loop which will rapidly be passed through the non-circulating spa water and raise the temperature of the thermostat sensing bulb. Thus the thermostat as a single control, both regulates the temperature of the spa water during the spa operation, and acts as a shut-off on the circulating pump when spa operation is terminated.

The invention makes practical the heretofore impractical use of the domestic hot water heater for spa heating by providing a self-contained heat exchanger system that both regulates the spa temperature during spa operation and which terminates heat input during spa non-operation. The system has relatively few parts and is easily assembled utilizing unskilled labor. The use of the thermostat for dual functions reduces the parts count and therefore the materials cost. Because low pressure water surrounds the high pressure domestic water, no danger of contamination of potable water sources is possible. The use of relatively efficient fuel sources for heating the hot water is maximized and the use of electric heat minimized.

DETAILED DESCRIPTION OF THE DRAWINGS

Figure 1:
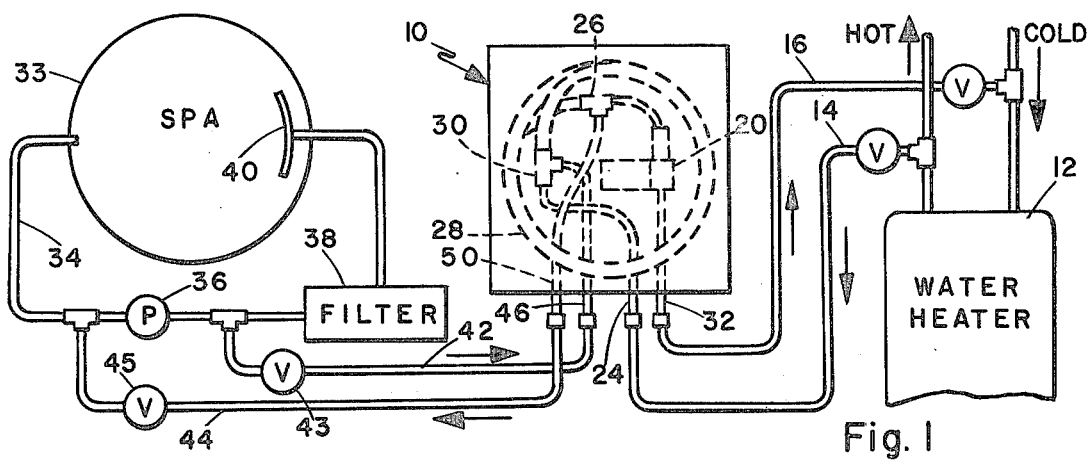
FIG. 1 illustrates schematically the plumbing system incorporating the heat exchanger system.
Figure 2:
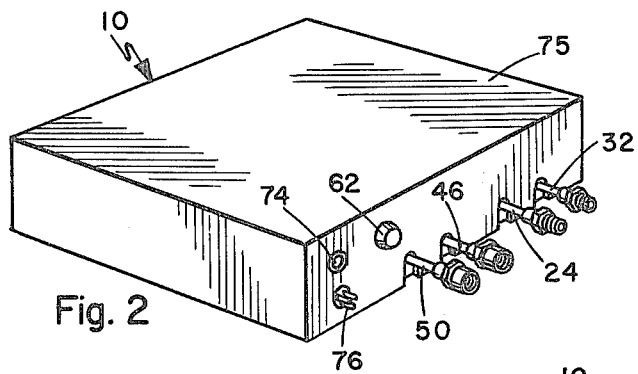
FIG. 2 is a perspective view of the heat exchange system in its housing.

Referring now to FIG. 1 of the drawings there is illustrated diagramatically an installation incorporating the heat exchanger system 10. Heat is withdrawn from the domestic hot water heater 12 by pipe 14 connected to the hot water outlet of water heater 12. After passing through the heat exchanger system, the water, which has been reduced in temperature to a temperature approximating that of the spa, is returned to the water heater via the cold water return pipe 16.

Figure 3:
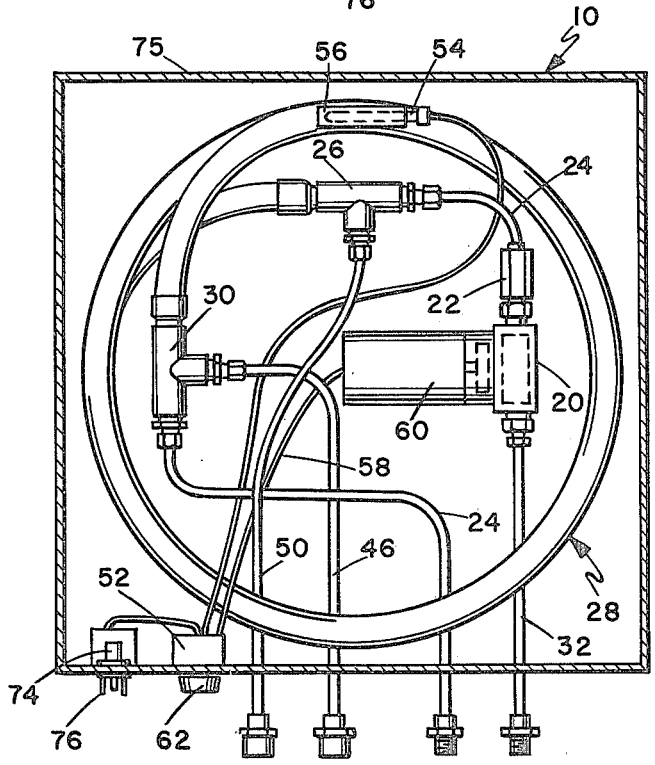
FIG. 3 is an enlarged top plan view of the heat exchanger system with the housing cover cut away.

Referring to FIG. 3, the path of the hot water from the hot water heater 12 in the heat exchanger system is illustrated. The hot water is drawn into tubing 24 by pump 20. The tubing 24 is received in a T-connector 30 and then is coiled into the circular heat exchanger loop 28. In exiting the loop 28, the tubing 24 passes through T-connector 26, check-valve 22, pump 20, and into the outlet pipe 32. Thus the first heat exchanger loop is the high pressure primary heat exchanger loop which utilizes water from the domestic hot water heater 12.

The second heat exchanger loop utilizes water from the spa 33. The normal spa circulation loop 34 incorporates a spa pump 36 which forces water through a filter 38 and out of the diagramatically illustrated jets 40. Water is drawn off of the spa circulating loop by line 42 on the high pressure side and returns to the spa circulating loop by line 44 on the low pressure side. Valves 43 and 45 are opened when heating of the spa is commenced; and they are closed when it is desired to circulate the spa water through the filter 38 without heating. The inlet spa water on line 42 is connected to the tubing 46 which passes into the T-connector 30 and into the second heat exchanger loop comprising tubing 48 (See FIG. 4). The tubing 48 surrounds the tubing 24 and is in a heat transfer relationship with the water in tubing 24. Thus the spa water is heated by conduction from the circulated domestic hot water and exits the T-connector 26 at a substantially elevated temperature. Tubing 50 connects between the T-connector 26 and the inlet spa connection on line 44.

A conventional thermostat 52 incorporates a microswitch which is activated by the physical movement induced by expansion of the fluid in the bulb 54. A suitable thermostat for this purpose is the Honeywell Company Thermostat, Model No. 1959. The bulb 54 is held in thermal contact with the outer tubing 48 by a socket 56 which is soldered to the tube 48. Thus the bulb 54 senses the temperature of the water in tube 48. A relatively high volume of water is circulated from the spa as compared to the water circulated from the hot water heater and so under spa operational conditions the bulb 54 senses the spa water temperature. When the spa temperature reaches the off set point of thermostat 52 the microswitch contact is broken and the electrical contact to the electric motor on line 58 is broken. Since pump 20 then ceases operation, the spa does not receive any additional heat and eventually the temperature drops below the on set point of thermostat 52, resulting in the closure of the microswitch contacts and the reactivation of motor 60. This cycling continues during normal spa operation.

When the spa circulation pump 36 is switched off, the water in tubing 48 no longer circulates. Accordingly, the water absorbs heat by thermal conduction through the piping to the water heater or intermittent operation of the pump 60. Thus passively the bulb 54 has now been converted into a device for detecting the temperature of the water in tube 24. Since the water in tube 24 is always above the highest set point which would be utilized for spa operation, only a very short interval of time is necessary after deactivation of the spa pump 36 before the thermostat 52 turns off motor 60. Thereafter, motor 60 will remain off unless insufficient heat is transferred by conduction through the pipe 14 and tube 24; in which event, an occasional and short operation of the motor 60 will draw high temperature water into the loop 28 resulting in the thermostat 52 again being cycled off.

Operation of the system is confirmed by a pilot light 74 which is illuminated only during pump operation. The pilot light, together with all of the inlet and outlet connections, the thermostat set point adjustment knob 62 and electrical connection 76 are all terminated on the same face of housing cover 75 so that all controls and connections are easily accessible. Locating all of the controls and connections on one face of the housing maximizes the number of different ways (including vertical or horizontal positioning) in which the device may be mounted.

Figure 4:
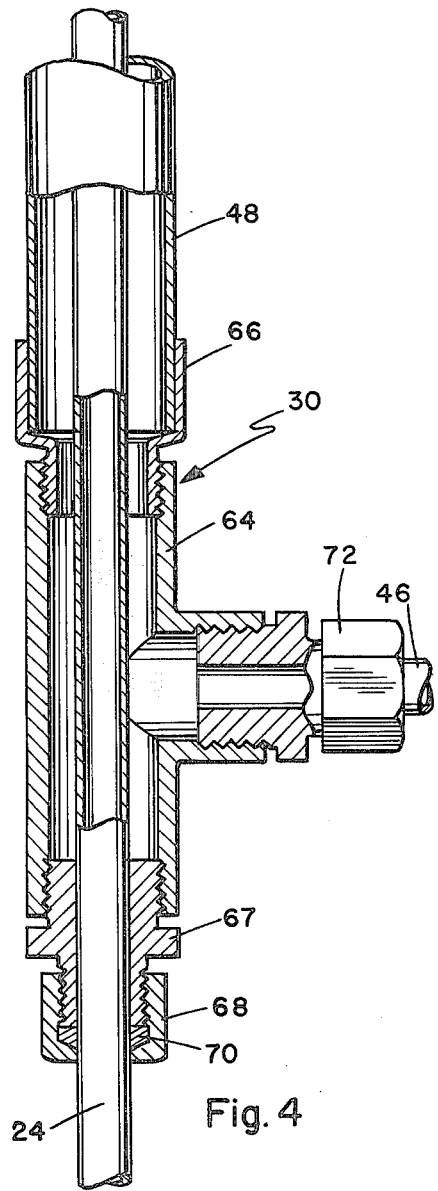
FIG. 4 is an enlarged view of a typical end connection of the heat exchanger outer tubing with portions cut away.

Referring specifically to FIG. 4, the detailed configuration of the T-connector is illustrated. A tubing-to-threaded adaptor 66 is soldered on the end of tubing 48. The T-connector is threaded on the adaptor 66 at the opposite end of the T-fitting. Threaded-to-compression fitting adaptor 67 is screwed into the body 64 of the T-connector. The threaded sleeve 68 is utilized to compress the ferrule 70 against the outer surface of the tubing 24 to provide a good seal. A substantially identical compression fitting 72 connects to the spa water inlet tubing 46. The use of compression fittings minimizes the number of soldering operations necessary for the assembly of the system.

The T-connectors and threaded fittings are of bronze or similar high conductivity material. All of the tubing within the system is copper. Thus, a high thermal conductivity is obtained and a high integrity for the high pressure water in the first heat exchange loop. Integrity for the high pressure water is further assured by the use of a pump 20 incorporating a magnetically driven rotor. The use of a magnetically driven rotor eliminates any moving seals and thereby assures a long life and high reliability. A suitable pump for such a purpose is a Teel Pump, Model No. 1P959 1/25.

The tubing 24 has approximately a one half inch outer diameter, whereas the tubing 48 has a substantially ¾ inch inner diameter. Thus a sufficient volume of flow is available through the second heat exchanger loop to substantially completely extract the available heat at the instantaneous temperature differential with a flow rate of 3 gallons per minute. This flow rate can be obtained with a 1/25th horse power electric motor 60. The use of an extremely low fractional horse power motor makes it possible to operate the motor directly off conventional thermostat microswitch contacts without any intervening relays, thereby avoiding the complexity, cost and assembly problems.

The lines 42 and 44 may be of an extended length because they carry relatively low temperature water and because the spa pump 36 is typically a high horse power pump which must be operated in any event during spa heating, and thus any pumping losses associated with the long run do not represent a significant loss in efficiency in the system. Such a heat exchanger system has been found to be capable of withdrawing approximately 36,000 B.T.U.'s per hour from the domestic hot water heater. Most domestic hot water heaters are capable of replacing this loss without a substantial loss in operating temperature. In a typical installation, for example, where a small domestic hot water heater is set to operate at 140 degrees Farenheit, the spa at 105 degrees Farenheit; and the spa has a capacity of 200 gallons, then approximately fifteen minutes after the commencement of heating the domestic hot water heater will be drawn down to 135 degrees. When the domestic hot water heater detects a drop in its operating temperture, the burner will be turned on and commences replacing the heat at a rate greater than it is withdrawn, so that one hour after operation commences, the domestic heaters' temperature will have returned to nominal (140 degrees) and the spa water temperature will be approximately 95 degrees. During continued operation, the domestic hot water heater temperature will be maintained at 140 degrees and in 20 minutes of additional operation the spa temperature raised from 95 to approximately 105 degrees Farenheit. Assuming 105 degrees to be the thermostat set point, then during continued operation the thermostat will cycle the operation of the motor 60 to maintain a nearly constant spa temperature.

Having described our invention, we now claim:

1. A heat exchanger system for installation adjacent a source of hot water and for transfer of heat to a quantity of water remote from said source of hot water, said heat exchanger system comprising:
   a first heat exchange loop comprising a water passage and a heat exchange surface,
   a second heat exchange surface,
   a second heat exchange loop adapted to be connected to receive water circulated from the quantity of water remote from the source of hot water and comprising a water passage surrounding a substantial portion of the length of said first heat exchange surface,
   circulation means connected to said first heat exchange loop for drawing water from and returning water to the source of hot water,
   thermostat means in thermal communication with said second heat exchange loop at a portion thereof that surrounds said first heat exchange loop for detecting the temperature of the water in said second heat exchange loop and turning off said circulation means when a pre-set temperature is reached, and for detecting the temperature in said first heat exchange loop in the absence of circulation in said second heat exchange loop, and shutting off said circulation means.

2. The heat exchanger system according to claim 1, wherein:
   said first heat exchange loop comprises a length of tubing having high thermal conductivity.

3. The heat exchanger system according to claim 2, further including:
   a housing, said first heat exchange loop being received in said housing and characterized by at least one circular loop.

4. The heat exchanger system according to claim 3, wherein:
   said second heat exchange loop comprises tubing having an inner diameter greater than the outer diameter of said first heat exchange loop.

5. The heat exchanger system according to claim 4, wherein:
   said second heat exchange loop comprises high thermal conductivity material,
   said thermostat means incorporating a sensing bulb,
   said sensing bulb being mounted in contact with a surface of said second heat exchange loop.

6. The heat exchanger system according to claim 1, further including:
   a quantity of water to be heated and second means for circulating water to and from said quantity of water,
   one end of said second heat exchange loop being connected to the inlet side of said second means and the opposite end of said second heat exchange loop being connected to the outlet side of said second means for circulating water.

7. A heat exchanger system for installation adjacent a source of hot water and for transfer of heat to a quantity of water remote from said source of hot water, said heat exchanger system comprising:
   a first heat exchange loop comprising tubing forming a water passage and a heat exchange surface,
   a second heat exchange loop comprising a water passage surrounding a substantial portion of the length of said first heat exchange surface,
   circulation means connected to said first heat exchange loop for drawing water from and returning water to the source of hot water,
   said second heat exchange loop being terminated on said first heat exchange loop with a T-connection sealed by a compression fitting received over the outer diameter of said tubing comprising said first heat change loop.

8. The heat exchanger system according to claim 6, further including:
   a check valve in said first heat exchange loop for preventing flow in a direction opposite to the flow induced by said pump.

9. The heat exchanger system according to claim 8, wherein:
   said pump incorporates a magnetically driven impellar and has no seals between surfaces that move relative to one another.

* * * * *